United States Patent [19]

Taschke et al.

[11] Patent Number: 4,934,827
[45] Date of Patent: Jun. 19, 1990

[54] MANUALLY GUIDED, MOTOR-DRIVEN ELECTRICAL TOOL

[75] Inventors: Franz Taschke, Stuttgart; Wilhelm Geis; Siegfried Stämmele, both of Leutenbach, all of Fed. Rep. of Germany

[73] Assignee: Licentia Patent-Verwaltungs-GmbH, Fed. Rep. of Germany

[21] Appl. No.: 219,973

[22] Filed: Jul. 15, 1988

[30] Foreign Application Priority Data

Jul. 16, 1987 [DE] Fed. Rep. of Germany ....... 3723517

[51] Int. Cl.$^5$ ..................... G05D 11/00; B01F 15/04
[52] U.S. Cl. .................... 366/162; 222/137; 366/177
[58] Field of Search ............ 366/160, 162, 177, 349, 366/189, 150, 255, 256; 222/135, 137

[56] References Cited

U.S. PATENT DOCUMENTS

| 3,302,832 | 2/1967 | Hardman | 366/162 |
| 4,566,610 | 1/1986 | Herb | 222/137 |
| 4,668,097 | 5/1987 | Nygren | 366/177 |

FOREIGN PATENT DOCUMENTS

| 2537022 | 2/1977 | Fed. Rep. of Germany . |
| 2821369 | 11/1979 | Fed. Rep. of Germany . |
| 3018438 | 11/1981 | Fed. Rep. of Germany . |
| 3418052 | 12/1984 | Fed. Rep. of Germany . |
| 8435167 | 5/1985 | Fed. Rep. of Germany . |
| 3412222 | 10/1985 | Fed. Rep. of Germany . |
| 3418630 | 11/1985 | Fed. Rep. of Germany . |
| 3535229 | 4/1987 | Fed. Rep. of Germany . |
| 2424856 | 11/1979 | France . |

Primary Examiner—Robert W. Jenkins
Attorney, Agent, or Firm—Spencer & Frank

[57] ABSTRACT

A manually guided electrical tool which is driven by a drive motor. The tool includes a device for metering and mixing at least two substances and for the feeding of the intermixed substances to a treatment place. The device includes: cartridges which contain the substances to be intermixed, receptacle pockets for receiving the cartridges, an extruding means associated with each cartridge for extruding the substances; a mixer for mixing the extruded substance which has an outlet through which the intermixed substances are fed, a feed duct connected to a each cartridge for transporting the extruded substances to the mixer, a gear unit driven by the drive motor, a drive element driven by the gear unit for activating the extruding means and the mixer; and a gear housing for housing the gear unit which is attached to the drive motor.

12 Claims, 5 Drawing Sheets 4,934,827

MANUALLY GUIDED, MOTOR-DRIVEN ELECTRICAL TOOL

FIELD OF THE INVENTION

The invention relates to an electrical tool which includes a device for metering and mixing at least two substances and for the feeding of the intermixed substances to a place to be treated.

An apparatus for the removal of cartridges which are retained in a cartridge-retaining device arranged at a common carrier housing, is described in Germany Petty Patent DE-GM 84 35 167. The piston of each cartridge in this device is displaced by a rod which are driven by an electrical motor. For this purpose, the electrical motor is connected by a thread-nut gear with the rods associated with each piston of a cartridge for the performance of a sliding movement. Mounted at the lower end of the cartridge-retaining device is a mixer unit engaging over this with a respective inlet associated with each cartridge. The inlets in that case open into a common outlet, to which a mixer with an exit nozzle is connected.

A device of this kind displays the disadvantage that a static mixer is used as the mixer. Such a mixer not only requires an appreciable contact pressure onto the substances to be pressed through it but it only partially intermixes the substances. Furthermore, the danger of an operational disturbance and/or damaging of the apparatus is great, in particular because no safety devices against overloads are provided, because of the relatively long transit time of the substances through the mixer, particularly when these solidify rapidly. Finally, it takes a relatively long time until the pressure pistons or their rods return to their initial position.

SUMMARY OF THE INVENTION

It is therefore an object of the invention to provide creating an electrical tool according to the species, which makes it possible to intermix two or more substances or components of different chemical nature with each other comparatively rapidly, more intensively, more operationally reliably and with a minimum amount of effort.

BRIEF DESCRIPTION OF THE DRAWINGS

As seen in FIG. 1, a stationary threaded spindle 3, which is rotatably supported by means of a double ball bearing tool in a gear housing 1, is driven by a pinion 6. The pinion 6 is mounted at an armature shaft 4 of a drive motor 5, by way of a spur wheel pair 55 and 52'. The wheels 55 and 52' are components of a gear unit 7, which is described in greater detail below. The threaded spindle or drive element 3 is housed in a carriage part 8, which has a four-cornered hollow profile. The end of the carriage part lying at the gear unit side contains a spindle nut 9, which is firmly mounted in the interior of the carriage part 8. Fastened at the other end of the carriage part 8 is a carrier 10 which supports the rearward ends of two ejector piston rods 11 and 12, which lie spatially one beside the other (see FIG. 2). The rods 11 and 12 are conveniently supported by means of hinge heads 13 and 14 in order to assure a certain movability of the ejector piston rods 11 and 12.

Figure 1:
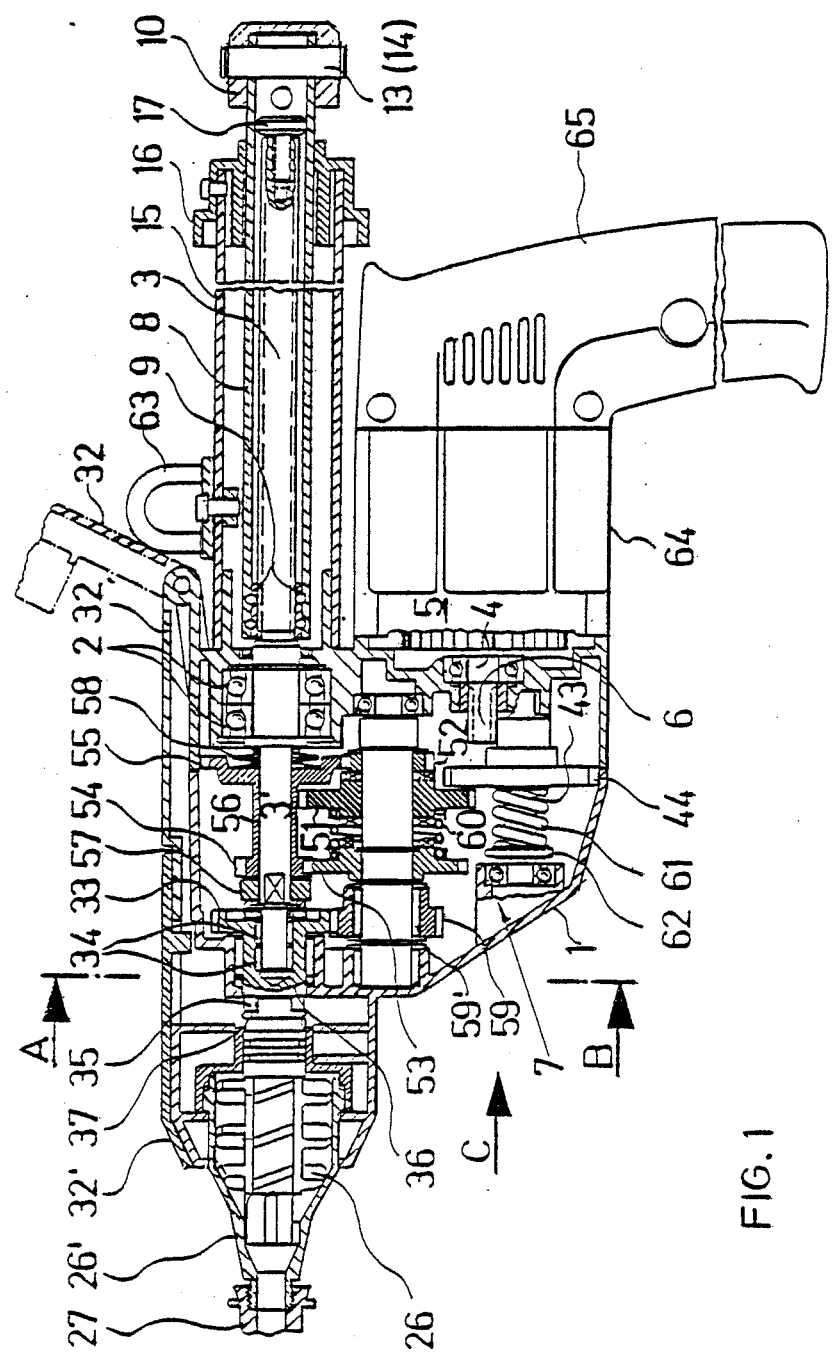
FIG. 1 is a partial sectional view of the electrical tool of one embodiment of the invention.

The carriage part 8, which is settable into an axial movement by the drive element 3 by way of the spindle nut 9, is disposed in the interior of a longitudinal strut 15. The longitudinal strut has a four-cornered hollow profile and has a guide 16 mounted thereon for both ejector piston rods 11 and 12 as well as for the carriage part 8, as also shown FIG. 2. Threaded into the rearward end face of the threaded spindle 3 is an abutment 17, which the carrier 10 bears on when the carriage is in its forward end position.

Figure 2:
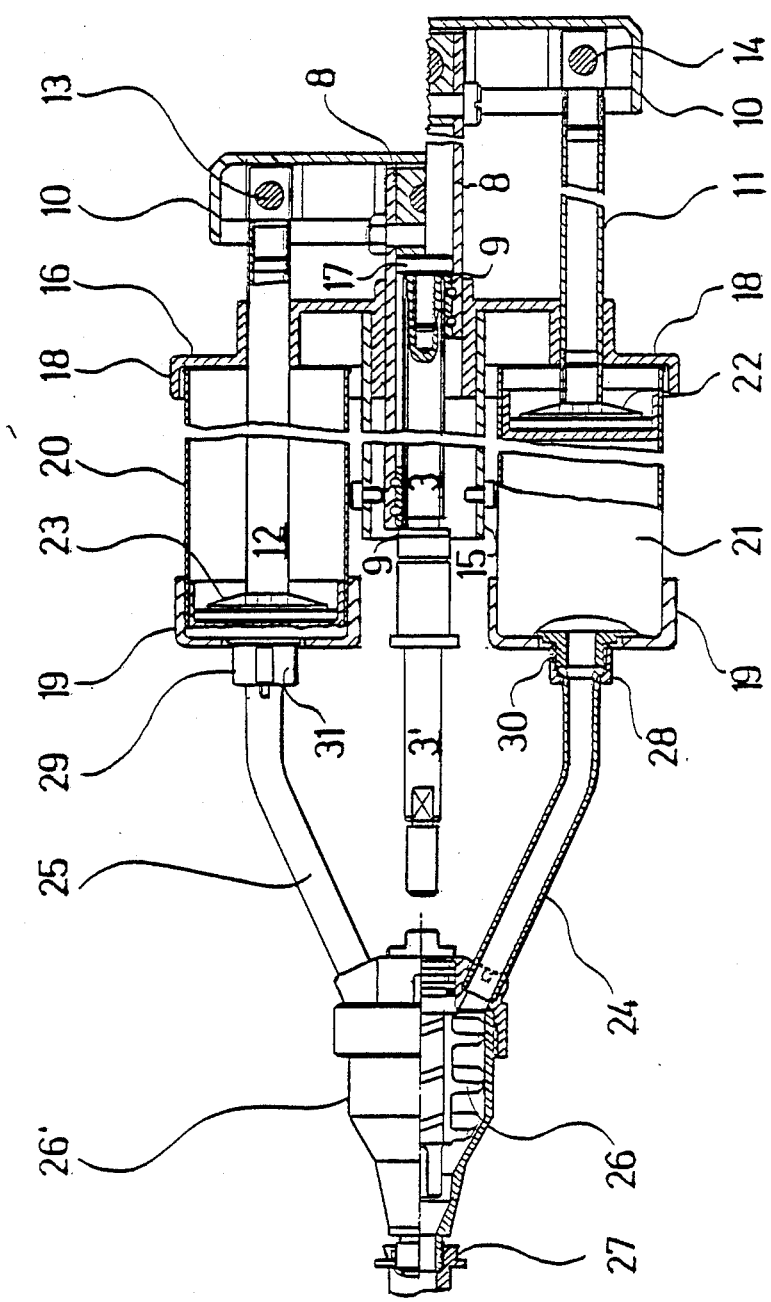
FIG. 2 is a plan view of the metering and mixing equipment in FIG. 1.

As can also be seen in FIG. 2, the guide 16 bounds receptacle pockets 18 and 19 for two cartridges 20 and 21, which contain the components to be mixed together, for example the components of a two-component adhesive substance. Within the cartridges are ejector pistons 22 and 23 which are associated with the ejector piston rods 11 and 12, respectively. On actuation of the device, each piston presses the contents of its associated cartridge by way of an associated feed duct 24 or 25 into a suitably constructed mixer 26, at which an exit nozzle 27 is mounted. The mixer head 26' with the mixer 26 and the feed ducts 24 and 25 to the cartridges preferably form a removable unit which may be made as a disposable unit. The cartridges 21 and 22 can also be component of this unit. The connections at the cartridge side of the mixer head feed ducts 24 and 25 are provided with box nuts 28 and 29, which are threadable onto the threaded nipples 30 and 31 of the cartridges. In order to exclude a mix-up of both the cartridges, the box nuts 28 and 29 preferably have threads of opposite pitch. For example, box nut 28 may have a right-hand thread and box nut 29 a left-hand thread. In this arrangement the threads of the threaded nipples 30 and 31 would be left-handed and right-handed, respectively. Additionally, the connections may be distinguished by making them different colours. Both the cartridges 20 and 21 are coverable by means of a lid 32, which is pivotably supported at the gear housing and can consist of a suitable synthetic material. This lid 32 is arrestable in the covering position.

Figure 4:
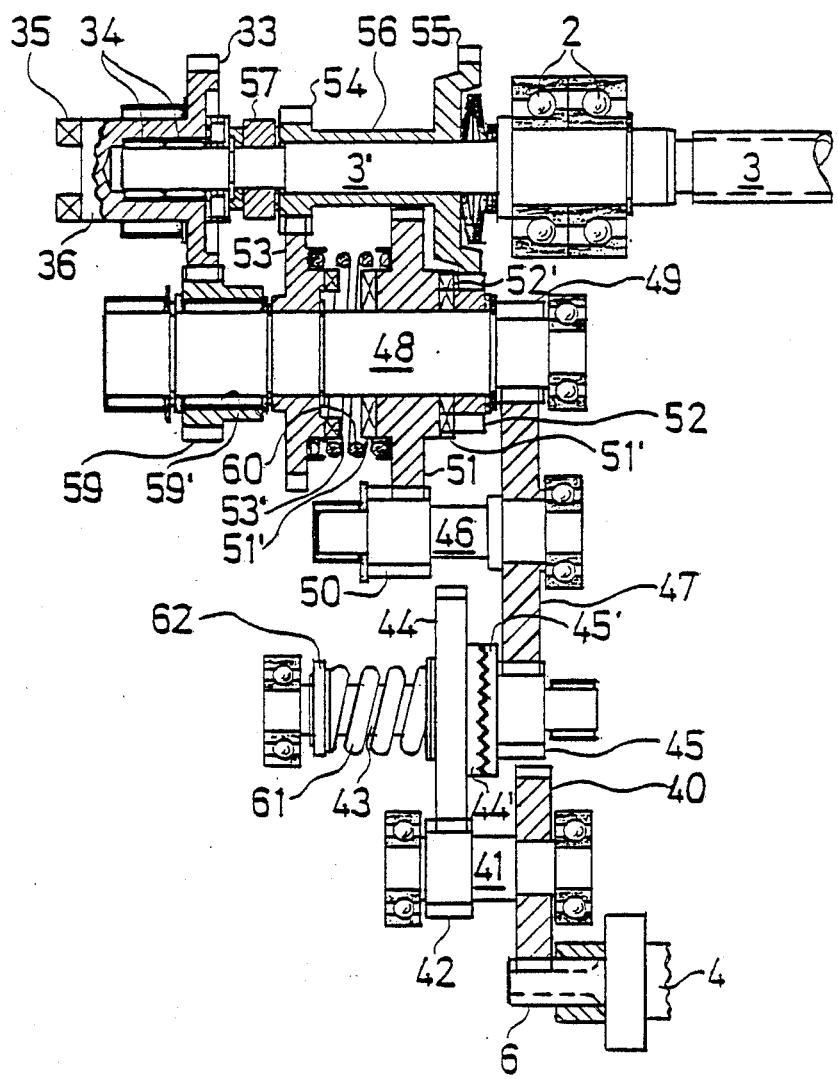
FIG. 4 is a side elevational view of the gear unit, wherein the gear elements are illustrated lying in one plane for the sake of greater clarity.

The gear unit 7 housed in the gear housing 1 is illustrated lying in one plane in FIG. 4. For the metered feeding of both the components to the mixer 26 or to the mixer head 26' in this embodiment, the threaded spindle 3 is set into a left-hand rotation by the gear unit 7 when the drive motor is switched on. Thereby, the carriage part 8 moves forward in the direction of the arrow from the initial position illustrated at the bottom in FIG. 2. The carrier 10 which is connected to the carriage part thus entrains both the ejector piston rods 11 and 12, thereby causing the ejector pistons 22 and 23 to act on the displaceable cartridge base to uniformly and progressively press the content of the respective cartridge through the feed ducts 24 and 25 into the mixer 26. The mixer head is driven by a toothed spindle wheel 33. The spindle wheel 33 is rotatably supported by means of needle bearing 34 on a spigot 3' of the threaded spindle 3 and contains a hollow hub 36 provided with claws 35. The claws 35 come into engagement with corresponding recesses 37 at the mixer 26, so that this rotates at a rotational speed corresponding to the chosen gear reduction.

The toothed wheel 40, which is driven by the pinion 6 of the armature shaft 4 of the drive motor 5, drives the intermediate shaft 41, on which a further toothed wheel 42 is mounted. The toothed wheel 42 meshes with a toothed wheel 44 setting the intermediate shaft 43 in rotation. The toothed wheel 44 stands under the effect of a helical spring 61, which is biased on the intermediate shaft by means of a retaining washer 62. The toothed wheel 44 is also provided with an index rim 44', which co-operates with an index rim 45' of a further toothed wheel 45 arranged on the intermediate shaft 43. When a certain limiting torque is exceeded, the intermediate shaft 43 stops. The toothed wheel 45 engages a further toothed wheel 47, which drives a further intermediate shaft 46 and engages a toothed wheel 45 fixedly mounted on an intermediate shaft 48. Seated on the intermediate shaft 46 apart from the toothed wheel 47 is a further toothed wheel 50, which drives a coupling toothed wheel 51 arranged to be rotatable and axially displaceable on the intermediate shaft 48. The coupling toothed wheel 51 possesses an index rim at each end face. These index rims are designated by 51' and 51". The one index rim 51' corresponds with a counter-index rim 52' mounted at the end face of a toothed wheel 52 disposed on the intermediate shaft 48. The other index rim 51" co-operates with a toothed rim 53', mounted at the end face of a toothed wheel 53 likewise provided on the intermediate shaft 48 and which is mounted to be freely rotatable on the intermediate shaft 48. The coupling toothed wheel 51 is held in its engaged position for the operating run by means of a spring 60.

Associated with both the toothed wheel 52 and 53 are two toothed wheels 54 and 55, which are component of a sleeve 56 arranged on the spigot 3' of the threaded spindle 3 and of which the one 54 possesses a smaller diameter. The unit consisting of the toothed wheel 54, the sleeve 56 and the toothed wheel 55 is coupled by means of a plate 57 with the threaded spindle 3 and stands under the axial force of a plate spring 58. The plate 57 is formed a dog plate, the dogs of which are run over by the corresponding counter-dogs at the end face of the sleeve 56 when a certain torque is exceeded so that the sleeve 56 with both the toothed wheels 54 and 55 rotates relative to the threaded spindle 3 which remains at standstill.

The spindle toothed wheel 33 for driving the mixer 26 is set into rotation by a toothed wheel 59 likewise arranged on the intermediate shaft 48. This toothed wheel contains a free wheel 59', which permits a rotation of the spindle toothed wheel 33 and thereby of the mixer 26 in the operative rotational direction of the threaded spindle 3, but not in the other rotational direction of the threaded spindle.

The reverse run of the carriage part 8 and therewith the reverse run of the ejector pistons conveniently takes place at a higher speed, and thus in a certain sense, in rapid motion. For this purpose, a second gear part is provided, which on the switching-over of the drive motor to the other rotational direction (for example from left-hand running to right-hand running) is activated and the overall step-down gearing of which is significantly lower than that for the operating process. The reverse run of the carriage 8 with the ejector piston then proceeds with corresponding rapidity.

On the switching-over of the drive motor, the coupling toothed wheel 51 is pushed towards the mixer head 26' on the intermediate shaft 48 against the restoring force effected by the spring 60 by means of a setting member. The setting member is activated automatically on the switching-over of the drive motor or to be actuated from outside. Thereby, the index rim 51" of the coupling toothed wheel 51 comes into engagement with the corresponding index ring 53' of the toothed wheel 53. At the same time, the mechanical coupling between the index rims 52' of the toothed wheel 52 and the corresponding index rim 51' of the coupling toothed wheel 51 is cancelled. All index rims are structured in sawtooth shape in order that they fulfill their function only in the intended direction of rotation.

The toothed wheel 53, which is freely arranged on the intermediate shaft 48 and meshes with the toothed wheel 54. The toothed wheel 53 is thereby coupled by way of the coupling toothed wheel 51 with the toothed wheel 50 which is seated firmly on the intermediate shaft 46 and by way of this in turn with the intermediate shaft 46. Therefore, the threaded spindle 3 is driven in reverse rotational direction and at a higher rotational speed. The reverse run or rapid motion rotational speed is therefore, freely selectable within limits. It can for example be two to three times as high as the operating rotational speed.

Figure 3:
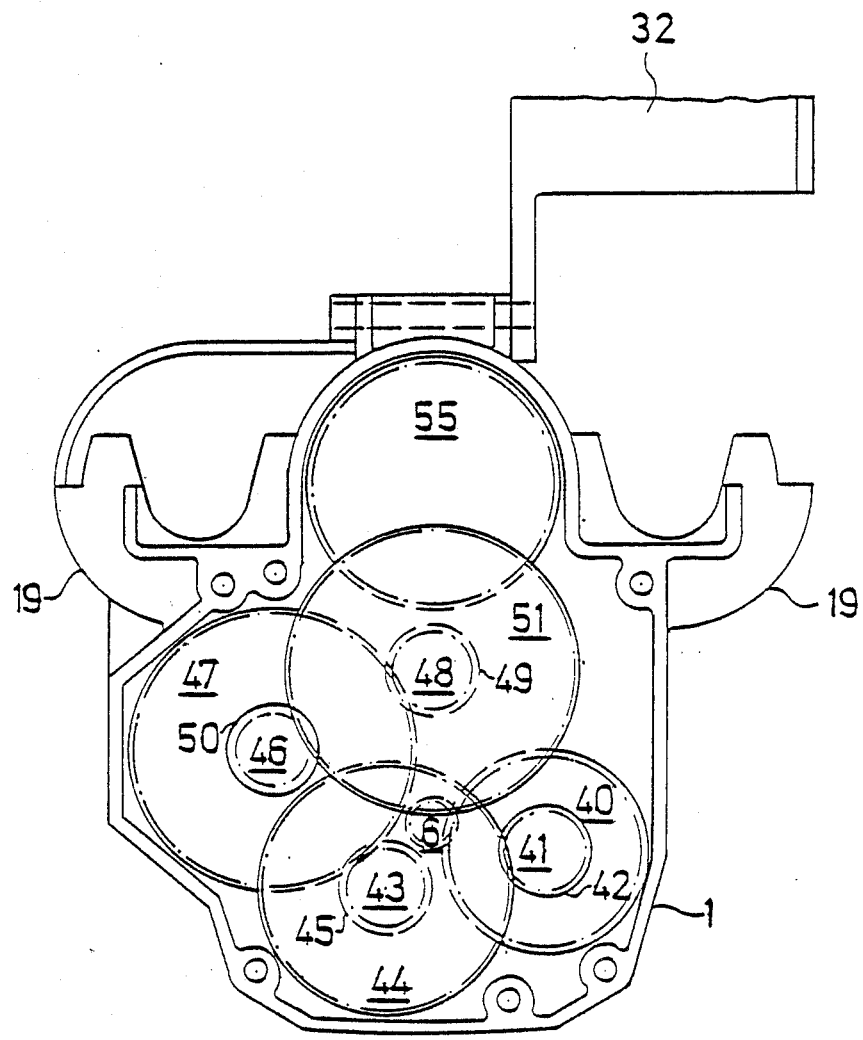
FIG. 3 is an elevational view along the section A-B of FIG. 1.

The actual arrangement of the gear unit is illustrated in FIG. 3. In that case, the corresponding toothed wheels, as far as recognisable, are provided with the same reference symbols as in FIG. 4. Furthermore, the receptacle pockets 19 for both the cartridges are evident from this view, likewise the pivotal bearing of the lid 32.

The lid 32 is constructed in two parts, wherein the second part 32' is guided to be axially displaceable for undertaking the arresting in the closed position of the lid as well as for unlocking. This guidance is realised thereby, that strips mounted laterally at the lid part 32' engage behind ribs provided at the gear housing 1 or come out of engagement with the ribs in the case of unlocking.

In case of the spur wheel gear unit, another gear design can also be used either wholly or partially. For example worm gear units and/or planetary gear units may be used.

If required, the ejector pistons can also be driven separately and moved at different speeds.

An eyelet 63 serves for the hanging-up of the handtool.

The manipulability of the equipment is assured through the use of a conventional electrical tool insofar as the motor and handgrip part 64 and 65 is concerned. The operation likewise takes place in the manner known from electrical tools by means of switch push-buttons and so forth. Frequently, the use of a battery-fed electrical tool is also advantageous.

The electrical tool equipped with the mixing and metering equipment is particularly suitable all also for the gluing-in of car window panes by means of two-component adhesive substances which are suitable for this as well as also other purposes.

Figure 5:
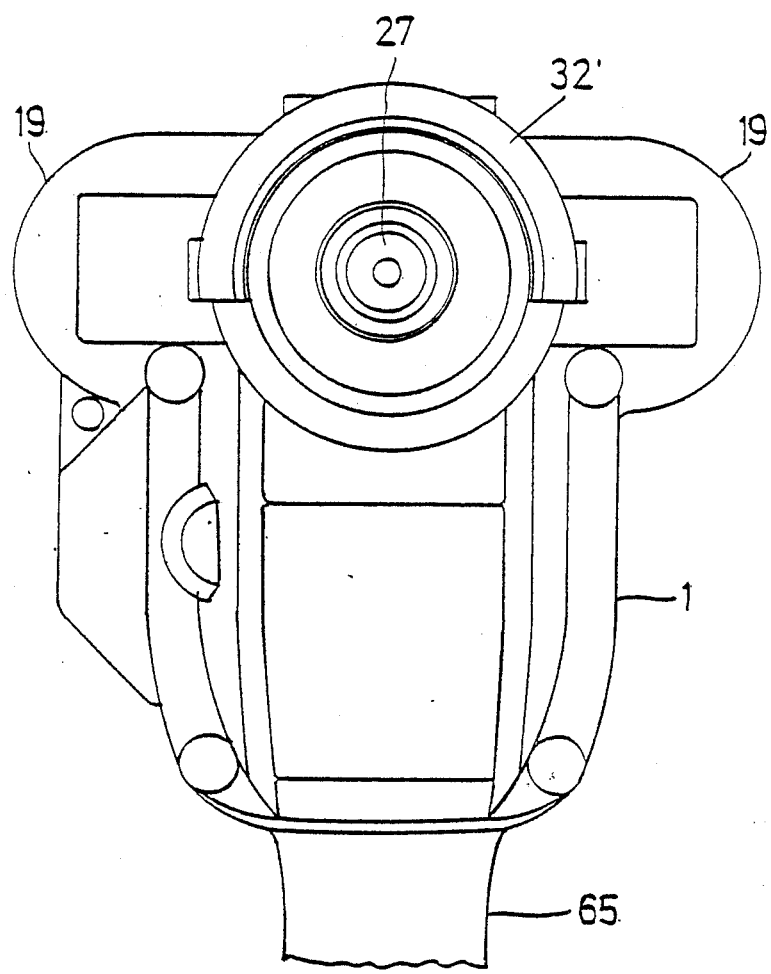
FIG. 5 is an elevational view of the electrical tool according to FIG. 1 in the direction C.

The compact shape of the electrical tool with the mixing apparatus is particularly easy to see in FIG. 5.

We claim:

1. A manually guided electrical tool which is driven by a drive motor, said tool including a device for metering and mixing at least two substances and for the feeding of the intermixed substances to a treatment place, said device comprising:

cartridges which contain the substances to be intermixed;

receptacle pockets for receiving said cartridges;

an extruding means associated with each said cartridge for extruding said substances;

a mixer for mixing said extruded substances, said mixer having an outlet through which said intermixed substances are fed;

a feed duct connected to a each said cartridge for transporting the extruded substances to said mixer;

a gear unit driven by said drive motor, said gear unit including:

a first gear means for driving said mixer;

a second gear means for controlling the forward rotational speed of said drive element, said second gear means including a clutch for protecting against torque overloads; and a third gear means for controlling the reverse rotational speed of said drive element, said third gear means including a clutch means for protecting against torque overloads;

a drive element driven by said gear unit for activating said extruding means and said mixer; and a gear housing for housing said gear unit, said gear housing being attached to said drive motor.

2. The electrical tool as set forth in claim 1, further comprising:

a longitudinal strut for guiding said extruding means and said drive element, said longitudinal strut being fixed to said gear housing.

3. The electrical tool as set forth in claim 1, wherein said mixer and said drive element rotate at different rotational speeds.

4. The electrical tool as set forth in claim 1, wherein said mixer, said mixer head, said feed ducts, and said cartridges comprise a removable unit.

5. The electrical tool as set forth in claim 1, wherein said drive motor comprises a drive motor which has a regulatable rotational speed and said gear unit comprises toothed wheel gears.

6. The electrical tool as set forth in claim 1, wherein said drive motor comprises a battery operated drive motor.

7. The electrical tool as set forth in claim 1, wherein there are two of said cartridges and each said cartridge is received by two receptacle pockets.

8. The electrical tool as set forth in claim 1, further comprising:

a hollow carriage in which said drive element is fixedly mounted by means of a spindle nut: and a carrier to which both of said extruding means are attached, wherein said drive element comprises a threaded spindle which is rotatably supported in said gear housing.

9. The electrical tool as set forth in claim 1, further comprising a tiltable lid for covering said mixer and said mixer feed ducts, said tiltable lid being arrestable in a covering position.

10. A manually guided electrical tool which is driven by a drive motor, said tool including a device for metering and mixing at least two substances and for the feeding of the intermixed substances to a treatment place, said device comprising:

cartridges which contain the substances to be intermixed;

receptacle pockets for receiving said cartridges;

an extruding means associated with each said cartridge for extruding said substances;

a mixer for mixing said extruded substances, said mixer having an outlet through which said intermixed substances are fed;

a feed duct connected to a each said cartridge for transporting the extruded substances to said mixer;

a gear unit driven by said drive motor;

a drive element driven by said gear unit for activating said extruding means and said mixer;

a gear housing for housing said gear unit, said gear housing being attached to said drive motor;

a hollow carriage in which said drive element is fixedly mounted by means of a spindle nut: and a carrier to which both of said extruding means are attached, wherein said drive element comprises a threaded spindle which is rotatably supported in said gear housing.

11. The electrical tool as set forth in claim 10, wherein said extruding means comprises ejector pistons which are attached to rods and said rods are attached to said carrier and supported in said carrier by means of hinge heads.

12. A manually guided electrical tool which is driven by a drive motor, said tool including a device for metering and mixing at least two substances and for the feeding of the intermixed substances to a treatment place, said device comprising:

cartridges which contain the substances to be intermixed;

receptacle pockets for receiving said cartridges;

an extruding means associated with each said cartridge for extruding said substances;

a mixer for mixing said extruded substances, said mixer having an outlet through which said intermixed substances are fed;

a feed duct connected to a each said cartridge for transporting the extruded substances to said mixer;

a gear unit driven by said drive motor;

a drive element driven by said gear unit for activating said extruding means and said mixer;

a gear housing for housing said gear unit, said gear housing being attached to said drive motor; and a tiltable lid for covering said mixer and said mixer feed ducts, said tiltable lid being arrestable in a covering position.

* * * * *